United States Patent [19]
Raivisto

[11] Patent Number: 6,081,601
[45] Date of Patent: Jun. 27, 2000

[54] METHOD OF IMPLEMENTING CONNECTION SECURITY IN A WIRELESS NETWORK

[75] Inventor: Tommi Raivisto, Helsinki, Finland

[73] Assignee: Nokia Telecommunications Oy, Helsinki, Finland

[21] Appl. No.: 09/014,086

[22] Filed: Jan. 27, 1998

[30] Foreign Application Priority Data

Jan. 8, 1998 [FI] Finland ...................................... 980028

[51] Int. Cl.[7] ..................................................... H04L 9/00
[52] U.S. Cl. ........................... 380/270; 380/273; 380/33; 380/34; 380/45; 380/47; 455/410
[58] Field of Search ................................. 380/25, 38, 48, 380/49; 709/230, 237

[56] References Cited

U.S. PATENT DOCUMENTS

| | | | |
|---|---|---|---|
| 5,280,529 | 1/1994 | Nost ........................................... | 380/49 |
| 5,455,861 | 10/1995 | Faucher et al. ............................. | 380/9 |
| 5,583,940 | 12/1996 | Vidrascu et al. ........................... | 380/49 |
| 5,657,390 | 8/1997 | Elgamal et al. ........................... | 380/49 |
| 5,689,566 | 11/1997 | Nguyen ..................................... | 380/25 |
| 5,802,178 | 9/1998 | Holden et al. ............................. | 380/49 |

*Primary Examiner*—Gail O. Hayes
*Assistant Examiner*—Paul E. Callahan
*Attorney, Agent, or Firm*—Altera Law Group LLC

[57] ABSTRACT

The invention relates to a method of providing connection security for a connection between terminals in a wireless network. In the method data is transmitted from a first terminal (MS1) via nodes in the network to a second terminal (MS2). The method according to the invention is characterized by that it includes the steps of: routing the transmitted data via a mediator (MD), using the first security method for providing connection security at the security protocol layer between the first terminal (MS1) and the mediator (MD), using the second security method for providing connection security at the security protocol layer between the mediator (MD) and the second terminal (MS2), and performing the security method conversion at the security protocol layer at the mediator (MD).

21 Claims, 5 Drawing Sheets

METHOD OF IMPLEMENTING CONNECTION SECURITY IN A WIRELESS NETWORK

FIELD OF THE INVENTION

The invention relates to a method of providing connection security for a connection between terminals in a wireless network.

BACKGROUND OF THE INVENTION

Figure 1:
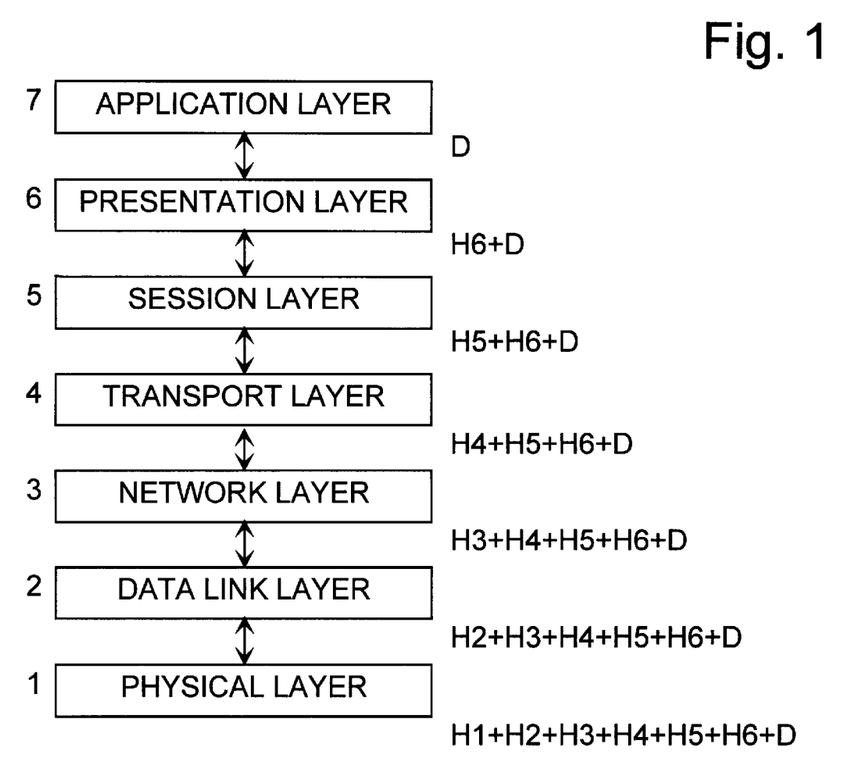
FIG. 1 shows a diagram of seven OSI layers.

An OSI model (Open Systems Interconnection reference model) has been developed in order to clearly identify the various levels involved in communication. FIG. 1 shows seven levels each of which deals with one specific aspect of communication. In each layer a problem concerning communication is solved independently of the other layers. For example, problems concerning reliable transport connections are dealt with at layer 4, the transport protocol layer, with suitable transport protocol. Also other models exist for communication modeling, such as internet.

In FIG. 1 each layer of the OSI model provides an interface to the one above it. The application protocol layer (layer 7) provides application data D to the layer 6 below it, i.e. to the presentation protocol layer, which adds a presentation header H6 to the application data D and transfers this modified data (H6+D) to the session protocol layer (layer 5). The session protocol layer adds its own header, i.e. session header H5, to the data that already consists of the application data D and the presentation header H6. Thus every layer adds its own header to the data it has received and transfers the modified data to the layer below it, until the physical protocol layer (layer 1) finally transmits the data (H1+H2+H3+H4+H5+H6+D) to a receiving party via a transmission media. The headers can be added either before or after the data at each layer. The receiving party reverses the data modification by removing the headers at the corresponding layers one at a time. Therefore, layer 1 removes the header H1 from the data received and transfers the rest of the modified data to the layer above it (layer 2), and so forth. Each header contains information for the protocol at the corresponding layer.

A security interface layered between an application protocol layer and a transport protocol layer is known from U.S. Pat. No. 5,657,390. In that publication the security protocol is implemented in a computer network through a "Secure Sockets Layer" library (the SSL library), which is bound to the application program. Before any data is transferred in the network, the communicating parties, i.e. the client and the server, negotiate an encryption technique for the data transfer.

Figure 2:
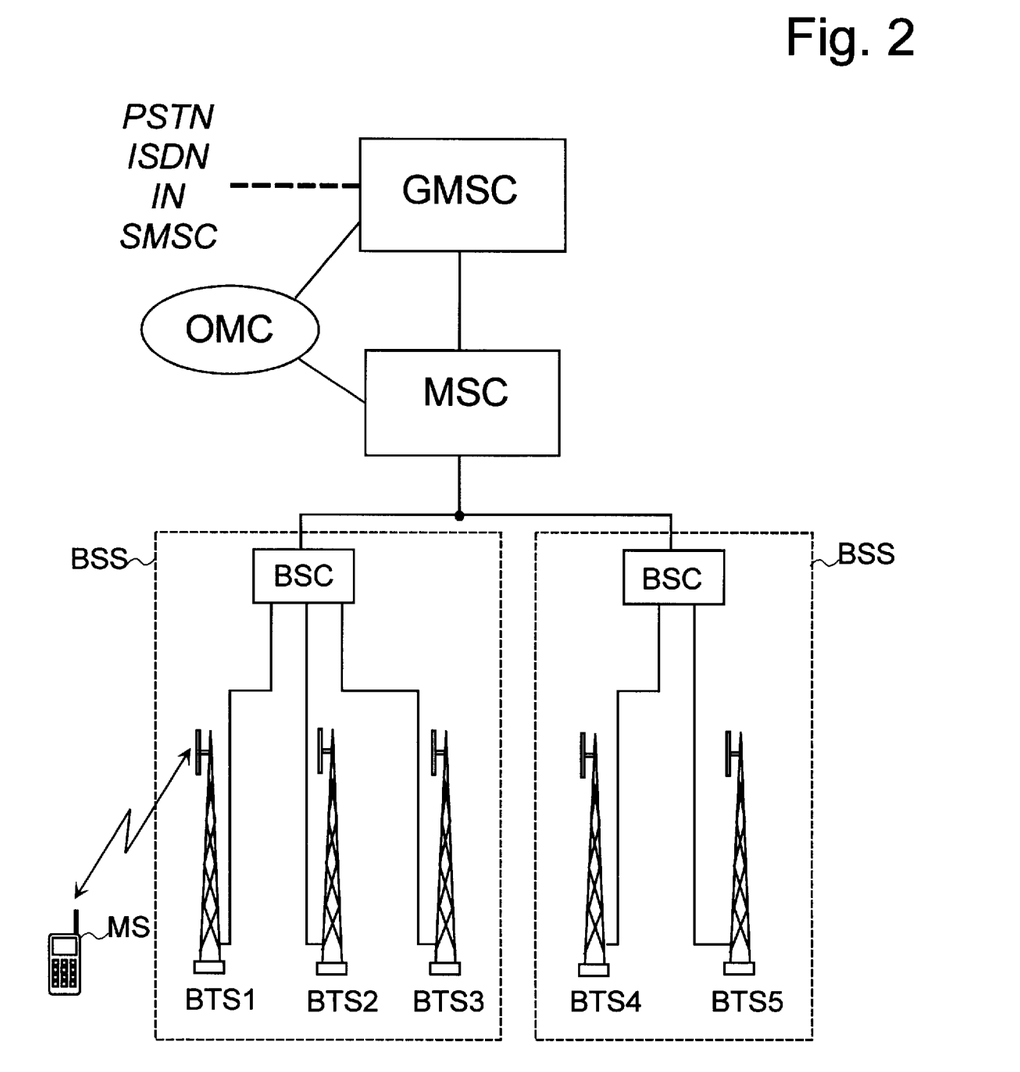
FIG. 2 shows the parts of the mobile communication network that are essential for the invention.

FIG. 2 of the attached drawing shows a simplified block diagram of the GSM mobile communications system (Global System for Mobile communications). The mobile station MS is connected via a radio path to a base transceiver station BTS, in FIG. 2 to the base station BTS1. A base station sub-system BSS consists of a base station controller BSC and the base stations BTS controlled by it. A mobile services switching center MSC usually controls several base station controllers BSC and is connected to other mobile services switching centers and a GMSC (Gateway Mobile Services Switching Center). Via the GMSC, the GSM network is connected to other networks, such as the PSTN (Public Switched Telephone Network), another mobile communication network PLMN, the ISDN network, the intelligent network IN, or the short message service center SMSC. The operation of the entire GSM system is monitored by the operation and maintenance center OMC.

Figure 3:
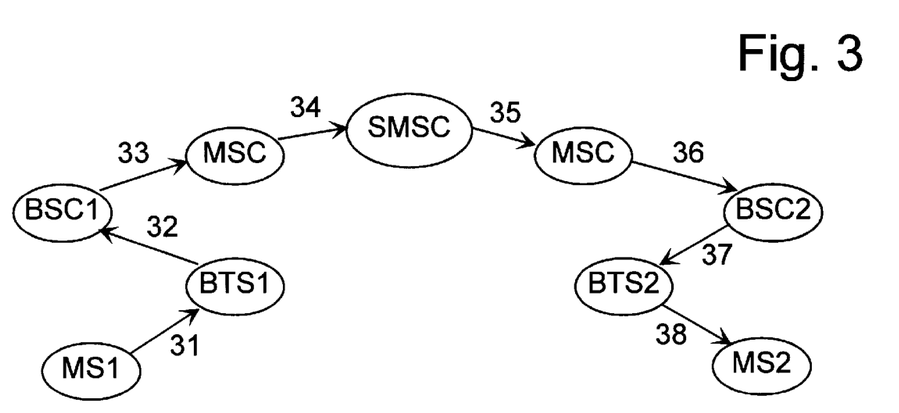
FIG. 3 shows the routing of a mobile to mobile short message.

In the digital GSM mobile communications system, in addition to speech and data connections a short message service is implemented. A point-to-point short message service is managed by the short message service center SMSC, which transfers the short message from one mobile subscriber to another, for example. FIG. 3 shows a mobile to mobile short message routing in a GSM network. MS1 initiates a short message addressed to MS2 and transmits it to BTS1 (message 31). From BTS1 the short message is transferred via BSC1 to the MSC in messages 32 and 33. In message 34 the short message is transferred from the MSC to the SMSC, which transfers it to the MSC of the current location of MS2 (message 35). From the MSC the short message is transferred in message 36 to the appropriate BSC, i.e. BSC2 in FIG. 3, which forwards the short message to BTS2 (message 37). In message 38 the short message is transmitted to the mobile station MS2. A short message can be routed via the same MSC and/or BSC and/or BTS from MS1 to MS2, if appropriate. For example, BSC2 in FIG. 3 might as well be BSC1. The short messages transferred in the network between the short message service center SMSC and the mobile stations are fully transparent. Usually the short messages are ciphered only in the air interface, i.e. in FIG. 3 only messages 31 and 38 are ciphered. The connection security issues are dealt with at a layer which is functionally equivalent to the data link protocol layer (layer 2) in the OSI model of FIG. 1.

In order to encrypt a short message in a mobile communications network for the whole transmission route from the message originator to the message receiver, the sending party and the receiving party have to share cryptographic keys and encryption algorithms. Due to limited processing and storing capacity at mobile stations, it is often not feasible to store cryptographic information of a plurality of other mobile stations at each mobile station in a key database. On the other hand, the cryptographic information can be exchanged during a handshake. At the beginning of a communication a handshake is usually performed between applications in telecommunication networks, during which the parties involved typically authenticate each other and exchange key information, for example, negotiate an encryption algorithm and the cryptographic keys to be used in communication. It is only after the handshake that the actual data is transmitted. In communications, such as transferring short messages in mobile communications networks, handshakes at the beginning of each communication action would burden the network unreasonably.

Figure 4:
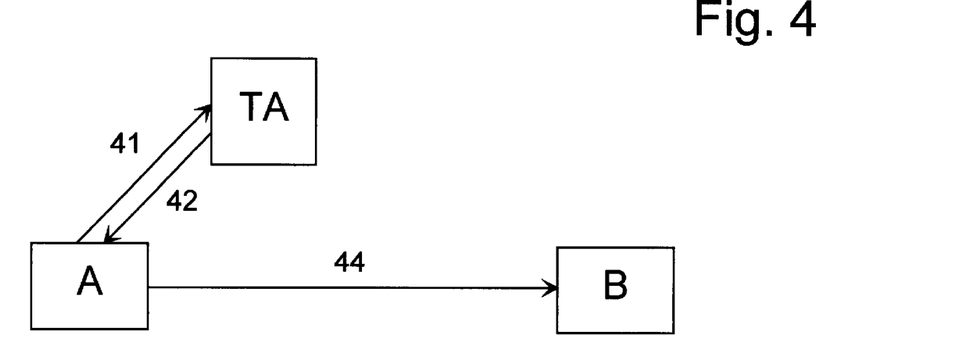
FIG. 4 shows a block diagram of a telecommunication connection using a trusted arbitrator in prior art.

From prior art in telecommunication the use of a trusted arbitrator for storing encryption keys and for forwarding these keys on request to subscribers is known. FIG. 4 shows this known key delivery from a trusted arbitrator. In FIG. 4 subscriber A initiates communication by requesting from the trusted arbitrator TA the encryption key of subscriber B (message 41). The encryption key stored in the key database of the trusted arbitrator TA can, for example, be a public key for asymmetric ciphering or a secret key for symmetric ciphering. The trusted arbitrator TA provides subscriber A with the requested encryption key (message 42), whereby subscriber A encrypts the message to be sent. Subscriber A transmits the encrypted message 44 to subscriber B, which decrypts the message received. Correspondingly, before answering subscriber A, subscriber B would request the encryption key of subscriber A from the trusted arbitrator TA and encrypt the message to be sent with this key before transmission.

With the security arrangement of a client to client connection, such as short message transfer, in a mobile communications network, the problem in communication connections is the availability of the encryption keys needed. On one hand, the key delivery requires numerous handshakes and messages between subscribers or between a subscriber and a trusted arbitrator. On the other hand, the problem with the key database implemented in mobile terminals is the limited processing capacity and memory in the terminals.

SUMMARY OF THE INVENTION

The object of this invention is to provide a simple way to implement connection security between communicating parties in a wireless network while minimizing the processing capacity and memory needed at communicating terminals.

This is achieved by using a method according to the invention characterized by what is stated in the independent claim 1. Special embodiments of the invention are presented in the dependent claims.

The invention relates also to an arrangement characterized by what is stated in the independent claim 15. Special embodiment are presented in the dependent claims 16–21.

The invention is based on the idea that communication of terminals in a wireless network is routed from a network node, such as the short message service center SMSC, through a mediator which is used as a middleman in converting the connection security of the communication. The mediator converts the connection security, such as encryption and/or the message authentication code MAC, of the information received from the sending terminal (client) into a form understandable by the receiving terminal (client) before forwarding the information to the receiving party. The connection security is provided by the sending terminal for the connection between the sending terminal and the mediator using the first security method at the security protocol layer, which is above the transport protocol layer and below the application protocol layer. Security for the connection between the mediator and the receiving terminal is provided by the mediator using the second security method at the security protocol layer. Examples of the first and second security methods are different encryption algorithms and/or cryptographic keys and/or security layer protocols. The security association is created between the clients and the mediator rather than between the clients. The mediator changes the security method used for connection security at security protocol layer and mediates information at protocol layers above the security protocol layer. The mediator receives the security methods needed from a database containing this subscriber data.

The advantage of the method according to the invention is that the management of keys and other parameters needed for connection security is simple and secure. When applying this method, only a few security parameters need to be stored at mobile terminals.

Another advantage of the method according to the invention is that mobile terminals using incompatible security algorithms and/or security layer protocols can communicate with each other with the connection security provided. For example, when an asymmetric security layer protocol is used terminals may act as clients while the mediator acts as a server for both at the security layer protocol.

Furthermore, another advantage is that the method does not require any modifications to the network infrastucture of the wireless network.

Yet another advantage of the method according to the invention is that the number of handshakes needed for initializing the connection security is reduced in communication connections in a wireless network, as is the need to exchange cryptographic keys.

BRIEF DESCRIPTION OF THE DRAWINGS

The preferred embodiments of the invention will now be described with reference to the attached drawings, in which.

DETAILED DESCRIPTION OF THE INVENTION

The present invention can be applied to any wireless network. The invention will be described below in more detail primarily by using the digital mobile communications system GSM as an example. FIG. 2 shows the simplified structure of a GSM network as described earlier. As background art of the operation and structure of a GSM system, a reference is made to GSM specifications and to the book: "The GSM System for Mobile Communications", M. Mouly & M. Pautet, Palaiseau, France, 1992, ISBN:2-9507190-0-7.

Figure 5:
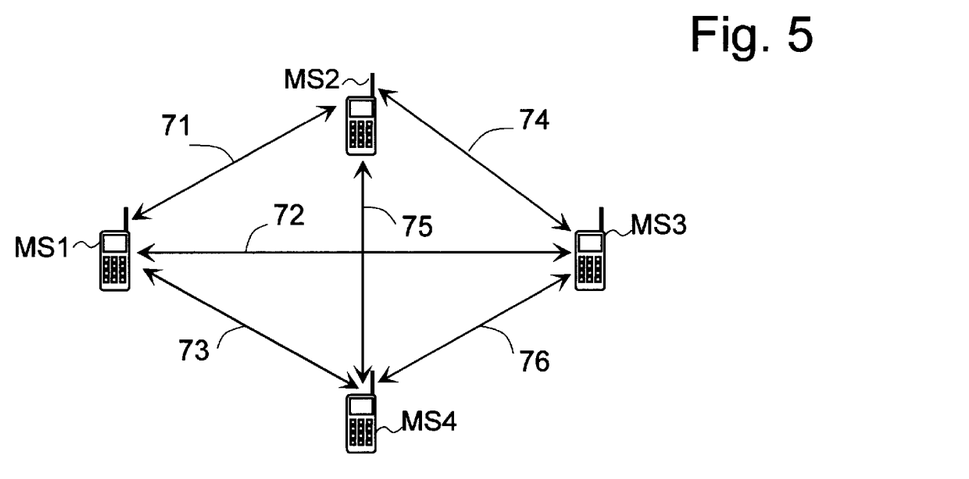
FIG. 5 shows a communication network.

FIG. 5 shows an example of a communication network with several connections. In FIG. 5 mobile stations MS1, MS2, MS3, and MS4 are in communication with each other, for example, with point-to-point short messages. This kind of communication forms connections 71–76 between mobile stations. Each of the mobile stations MS1–MS4 use their own connection security method, for example, cryptographic keys.

In the following, the primary embodiment of the invention is described in more detail with reference to FIGS. 5, 6, 7, and 8. In the primary embodiment of the invention a sending terminal transmits a short message to a receiving terminal and the short message is routed from a short message service center SMSC through a mediator. In the primary embodiment the connection security is provided with encryption.

Figure 6:
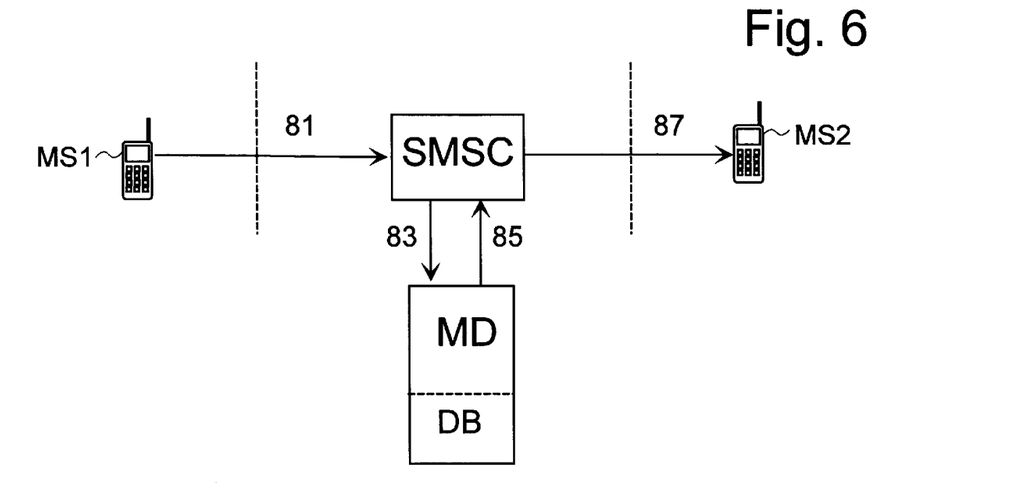
FIG. 6 shows the primary embodiment of the invention as a block diagram.

FIG. 6 shows connection 71 of FIG. 5 in more detail. In this example, according to the primary embodiment of the invention, MS1 encrypts at security protocol layer, which is above the transport protocol layer, i.e. layer 4 in FIG. 1, and below the application protocol layer, i.e. layer 7 in FIG. 1, a message with a cryptographic key K1 and at lower layers addresses the message to be sent to MS2. The first cryptographic key K1 can be the public key of the mediator used in a public key algorithm or a secret key shared between MS1 and the mediator MD and used in a symmetric ciphering algorithm, for example. MS1 transmits the encrypted message 81, which is then routed via the GSM network to the short message service center SMSC according to prior art. There is no need to decrypt the message for routing, since the address of the receiving party is not encrypted. According to the invention, the SMSC recognizes the message and forwards it to a mediator MD (transfer 83), which decrypts the message and encrypts it again at security protocol layer with second security parameters K2 suitable for MS2. The second cryptographic key K2 can be the public key of MS2 used in a public key algorithm or a secret key shared between the mediator MD and MS2 and used in a symmetric ciphering algorithm, for example. The mediator MD then transfers the re-encrypted cipher text back to the SMSC (transfer 85). If the SMSC is the mediator, transfers 83 and 85 are not needed. The SMSC forwards the cipher text to the receiving party MS2 via the GSM network according to prior art (message 87).

Thus the message is transmitted as a cipher text from MS1 to MS2, first encrypted with the first parameters between MS1 and the mediator MD and then with the second parameters between the mediator MD and MS2. Therefore, MS1 and MS2 only need to know the cryptographic parameters of the mediator MD, not the cryptographic parameters of each other, since the mediator MD alone handles the end user's security parameters. This is especially advantageous in mobile communications networks and wireless networks where terminals have limited processing capacity and memory available. The protocol layers above the security protocol layer, such as the session protocol layer in FIG. 1, see the connection as one hop connection from the transmitting party, i.e. MS1, to the receiving party, i.e. MS2.

MS1 can also indicate in the message header, for example, if the message should be routed to a certain mediator MD. This can be implemented as an appendix, such as a postfix, attached to the address of the SMSC or to the address of the receiving party MS2. In the case of the SMSC address 123456, for example, the address 1234561 would direct the message to mediator1, the address 1234562 to mediator2, and the address 123456 without a postfix would route the message according to prior art without a mediator. If no indication is given, all messages or certain types of messages, such as all the mobile to mobile short messages, can be routed to the mediator.

The information about the connection security method of the terminals connected to the service, such as the cryptographic keys, are stored either permanently or temporarily in a parameter storage, such as a database DB, which is advantageously located in association with the mediator device. The database DB obtains the connection security method information of the subscribers of the service from an operator as a preset value or through handshakes with the subscribers. In the case of connection security information obtained during handshake, this information can be maintained in the database DB for a predetermined period or permanently. The security parameters needed for security method conversion are retrieved from this parameter storage DB.

The other connections 72–76 in FIG. 5 are implemented accordingly. According to the primary embodiment of the invention, the mobile terminals MS1–MS4 communicating with each other in FIG. 5 only need to use the cryptographic key suitable for communicating with the mediator, thus decreasing to one or only a few the number of cryptographic keys used by individual mobile terminals. The need to exchange cryptographic keys in handshakes or otherwise is also reduced.

Figure 7:
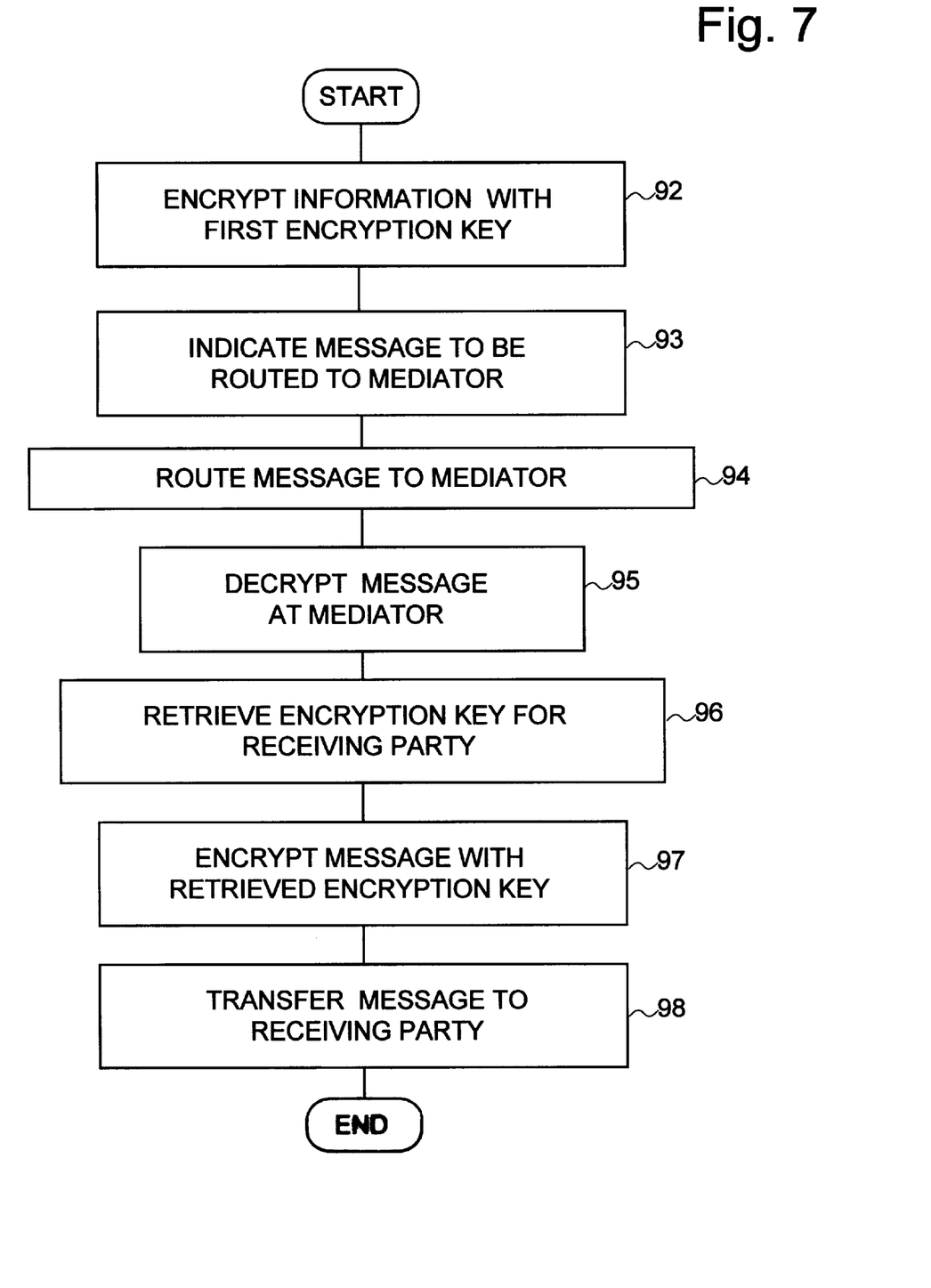
FIG. 7 shows the primary embodiment of the method according to the invention as a flowchart.

FIG. 7 shows the primary embodiment of the invention as a flowchart. At stage 92 the transmitting terminal encrypts the information to be sent with a first encryption key at security protocol layer. At stage 93 the transmitting terminal indicates at lower layers in the message the mediator to which the message is to be routed. The terminal transmits the encrypted message and it is routed from a network node, i.e. the SMSC, to the mediator (stage 94), which decrypts the encrypted message (stage 95). At stage 96 the mediator retrieves a second encryption key suitable for the receiving terminal, for example, from a database, which can be located in association with the mediator. The mediator encrypts the message with the retrieved encryption key of the receiving terminal (stage 97) and transfers the encrypted message back to the network node, i.e. the SMSC, which transfers the message to the receiving party (stage 98).

In other embodiments of the invention, the security protocol conversion performed at the mediator can include the changing of an encryption algorithm and/or cryptographic key and or security layer protocol.

The mediator device described above in connection with the primary embodiment can be part of the network node, such as the short message service center SMSC, or a separate unit connected to the network, such as a server connected to the SMSC. The mediator can be physically isolated in a secure place. The mediator functionality can also be separated from the mobile communication network or wireless network operation. In this case, the mediator can be a private mediator, such as a mediator for employees in a certain company, or an authority running the operation. The mediator needs to be able to realize all the security algorithms that the subscribers use.

In order to be able to implement the method according to the invention, the mediator has access to a database which contains the connection security method information of the terminals connected to the service. It is advantageous that the mediator also maintains the database. Only the mediator is able to decrypt the messages to be forwarded to the receiving terminal. If there are two or more mediators with their own databases, an indication must be given of which mediator is to be used. This can be implemented with an appendix, such as a postfix, to the SMSC address or to the receiving party address in the manner described above, for example. Another possibility is to route the message to a certain mediator based on the identity of the transmitting terminals, such as IMSI or MSISDN.

Also message authentication code MAC can be used to provide transmitted data with integrity and authentication. In other embodiments of the invention, encryption and/or MAC can be used for providing connection security and thus be converted at the mediator according to the present invention using different sets of cryptographic keys and/or sets of cryptographic algorithms and/or security layer protocols. The mediator can calculate the MAC using the received message and the same hash function and key as the transmitting party and compare this calculated MAC to the MAC attached to the message in order to verify it. In a similar manner, the mediator can calculate a new MAC using the message and a hash function and key of the receiving party and then attach this calculated MAC to the re-encrypted message to be sent to the receiving party. The receiving party is then able to verify the message integrity and authenticity based on the MAC.

Figure 8:
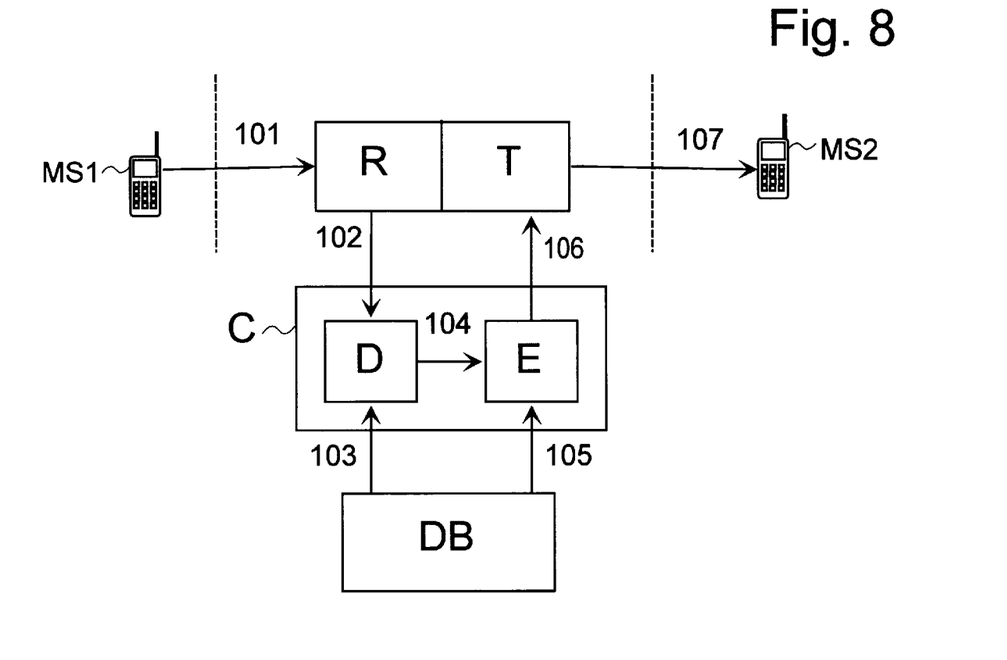
FIG. 8 shows the arrangement according to the primary embodiment of the invention.

FIG. 8 shows the arrangement according to the invention. The arrangement includes a routing unit R for routing an information packet received from a transmitting terminal, a converting unit C for dissembling and assembling connection security using different connection security methods, a database DB for storing the information about the connection security method of the subscriber terminals, and a transmission unit T for forwarding the converted information packet to the receiving party. The converting unit and the database DB can be located remotely from the routing unit R and the transmission unit T. In the primary embodiment of the invention the converting unit C includes a decryption unit D for decrypting the information packet and a re-encryption unit E for encrypting the decrypted information packet.

In the primary embodiment of the invention the routing unit R is arranged for receiving an encrypted message 101 from MS1, a short message, for example, and forwarding this message to a decryption unit D in message 102. The decryption unit D gets from the database DB (message 103) the connection security method information needed for the decryption of the message. The decryption unit D performs the decryption and forwards the decrypted message 104 to the re-encryption unit E, which gets from the database DB (message 105) the cryptographic information needed for the re-encryption of the message. The re-encryption unit E encrypts the message with the information received from the database DB and transfers the re-encrypted message 106 to the transmission unit T, which forwards the message to the receiving party MS2 in message 107. In FIG. 8 messages 101 and 102 are encrypted with a first security method, and messages 106 and 107 are encrypted with a second security method.

Figure 9:
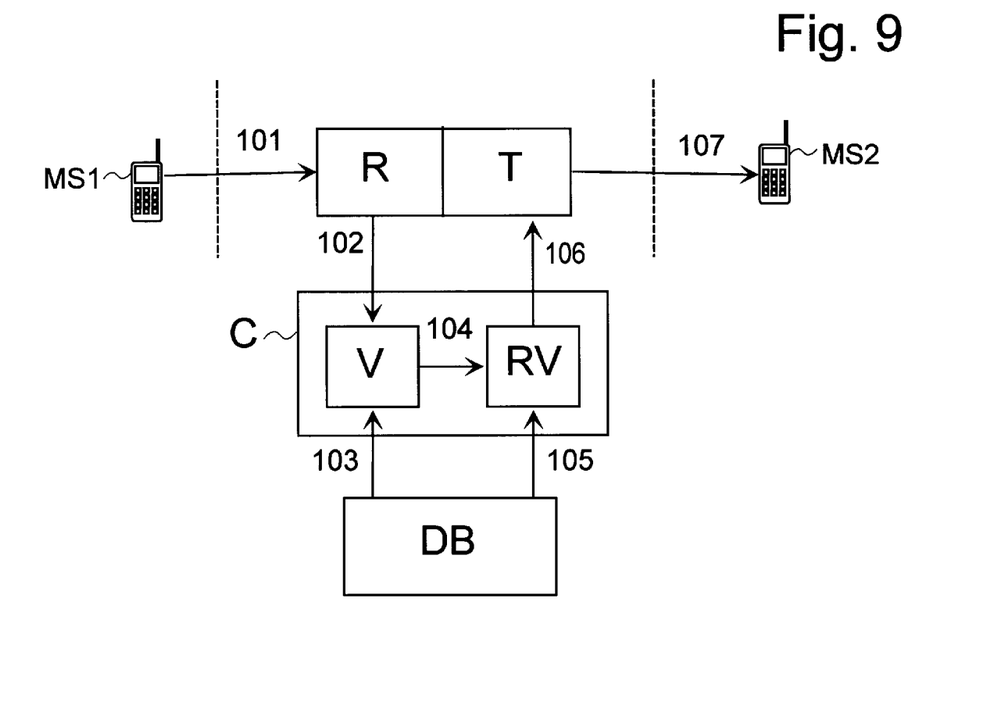
FIG. 9 shows the arrangement of the invention according to one embodiment.

FIG. 9 shows the arrangement according to another embodiment of the invention. In this embodiment connection security is provided with a message authentication code MAC. In FIG. 9 the converting unit C includes a verification unit V for verifying the transmitted data using MAC and a re-verification unit RV for calculating MAC with different connection security method. Otherwise, the arrangement corresponds to the primary embodiment of the invention as described above.

In other embodiments of the invention, the two embodiments of the arrangement described above can be combined in order to include the decryption unit D, the re-encryption unit E, the verification unit V, and the re-verification unit RV in the converting unit.

From the subscriber's point of view, the service according to the invention is fully transparent. A security protocol layer for the invention can be on top of the transport protocol layer, which is functionally equivalent to the OSI-model layer 4 in FIG. 1, and below the application protocol layer, which is functionally equivalent to the OSI-model layer 7 in FIG. 1.

The drawings and the related descriptions are only intended to demonstrate the principles of the invention. The details of the method according to the invention can vary within the patent claims. Although the invention was described above primarily in terms of mobile to mobile short message transmission, it can also be used in any other client to client connection in any wireless network. The invention is also suitable for use with only some of subscribers or communication connections in a network. The invention is not restricted for use only in connection with the ciphering algorithms presented above, but can be applied together with any connection security algorithms.

I claim:

1. A method of providing connection security for a connection between terminals in a wireless network, in which connection a security protocol layer for connection security function is above a transport protocol layer and below an application protocol layer, the method including the following steps:

transmitting data from a first terminal (MS1) via nodes in the network to a second terminal (MS2), characterized in that the method further includes the steps of:

storing information about the subscriber security method of at least the first and the second terminal (MS1 and MS2) in a database (DB), wherein the information in the database (DB) about the subscriber security method includes security layer protocols of the terminals, routing the transmitted data via a mediator (MD), using a first security method for providing connection security at the security protocol layer between the first terminal (MS1) and the mediator (MD), using a second security method for providing connection security at the security protocol layer between the mediator (MD) and the second terminal (MS2), and performing security method conversion at the security protocol layer at the mediator (MD).

2. A method according to claim 1, characterized in that the network node is a mediator (MD).

3. A method according to claim 1, characterized in that the method further includes the step of:

retrieving the security information of the terminals (MS1, MS2) from a database (DB) for the conversion.

4. A method according to claim 2, characterized in that the method further includes the steps of:

indicating the transmitted data to be routed from the first terminal (MS1) to a chosen mediator (MD) and routing the transmitted data to the chosen mediator (MD).

5. A method according to claim 2, characterized in that the transmitted data is a short message and the method further includes the steps of:

transmitting data from the first terminal (MS1) via an intermediate network node to the second terminal (MS2), routing the transmitted data from the the intermediate network node to the mediator (MD), and routing the transmitted data as converted from the mediator (MD) back to the intermediate network node.

6. A method according to claim 5, characterized in that the intermediate network node comprises a short message service center(SMSC).

7. A method according to claim 6, characterized in that the mediator (MD) is connected with a fixed link to the short message service center (SMSC) in association with a GSM network.

8. A method according to claim 6, characterized in that the method further includes the steps of:

indicating by an appendix to the address of the short message service center (SMSC) that the transmitted data is to be routed from the first terminal (MS1) to a chosen mediator (MD) and routing the transmitted data to the chosen mediator (MD).

9. A method according to claim 4, characterized in that the method further includes the step of:

indicating by an appendix to the address of the second terminal (MS2) that the transmitted data is to be routed from the first terminal (MS1) to a chosen mediator (MD) and routing the transmitted data to the chosen mediator (MD).

10. A method according to claim 1, characterized in that the method further includes the steps of:

providing connection security between the first terminal (MS1) and the mediator (MD) with a first set of cryptographic keys and providing connection security between the mediator (MD) and the second terminal (MS2) with a second set of cryptographic keys.

11. A method according to claim 1, characterized in that the method further includes the steps of:

providing connection security between the first terminal (MS1) and the mediator (MD) with a first set of cryptographic algorithms and providing connection security between the mediator (MD) and the second terminal (MS2) with a second set of cryptographic algorithms.

12. A method according to claim 1, characterized in that the method further includes the steps of:

providing connection security between the first terminal (MS1) and the mediator (MD) with a first set of cryptographic keys and a first set of cryptographic algorithms and providing connection security between the mediator (MD) and the second terminal (MS2) with a second set of cryptographic keys and a second set of cryptographic algorithms.

13. A method according to claim 1, characterized in that the method further includes the steps of:

providing connection security between the first terminal (MS1) and the mediator (MD) with a first security layer protocol and providing connection security between the mediator (MD) and the second terminal (MS2) with a second security layer protocol.

14. A method according to claim 1, characterized in that connection security is provided using encryption.

15. A method according to claim 1, characterized in that connection security is provided using the message authentication code MAC.

16. An arrangement for providing connection security for a connection between terminals in a wireless network, where a first terminal (MS1) transmits data via nodes in the network to a second terminal (MS2), characterized in that the arrangement includes a mediator (MD) for converting the security method of the transmitted data, which includes:

a database (DB) containing information about the subscriber security method of at least the first and the second terminal (MS1 and MS2), and wherein the information in the database (DB) about the subscriber security method contains security layer protocols of the terminals and a converting unit (C) for dissembling connection security using first security method and assembling connection security using second security method, a routing unit (R) for routing the transmitted data from a network node to the mediator (MD), and a transmission unit (T) for transmitting the transmitted data as converted to the second terminal (MS2).

17. An arrangement according to claim 16, characterized in that the converting unit (C) includes a decryption unit (D) for decrypting the transmitted data received from the first terminal (MS1) and a re-encryption unit (E) for re-encrypting the decrypted transmitted data.

18. An arrangement according to claim 16, characterized in that the converting unit (C) includes a verification unit (V) for verifying the transmitted data and a re-verification unit (RV) for making verification of the transmitted data with different security information.

19. An arrangement according to claim 16, characterized in that the subscriber security method information in the database (DB) contains cryptographic keys of the terminals.

20. An arrangement according to claim 16, characterized in that the subscriber security method information in the database (DB) contains encryption algorithms of the terminals.

21. An arrangement according to claim 16, characterized in that the arrangement is connected to a short message service center (SMSC) in association with a mobile communication network.

* * * * *